(12) United States Patent
Lisberger

(10) Patent No.: US 7,867,760 B2
(45) Date of Patent: Jan. 11, 2011

(54) BIOSCRUBBER

(75) Inventor: Manfred Lisberger, Riedau (AT)

(73) Assignee: Scheuch GmbH, Aurolzmuenster (AT)

( * ) Notice: Subject to any disclaimer, the term of this patent is extended or adjusted under 35 U.S.C. 154(b) by 1046 days.

(21) Appl. No.: 11/606,605

(22) Filed: Nov. 30, 2006

(65) Prior Publication Data

US 2007/0122900 A1    May 31, 2007

(30) Foreign Application Priority Data

Nov. 30, 2005  (AT)  ............... A 1931/2005

(51) Int. Cl.
*C12M 1/14* (2006.01)
*C12M 3/04* (2006.01)

(52) U.S. Cl. .................................. 435/299.1

(58) Field of Classification Search ............... 435/299.1
See application file for complete search history.

(56) References Cited

U.S. PATENT DOCUMENTS

| 1,848,334 | A | * | 3/1932 | Fedeler | ....................... 261/111 |
| 3,976,448 | A | * | 8/1976 | Eng et al. | ....................... 96/53 |
| 4,723,968 | A | * | 2/1988 | Schippert et al. | ............... 95/205 |
| 4,781,732 | A | | 11/1988 | Wondrasch et al. | |
| 5,077,025 | A | * | 12/1991 | Glass | ....................... 423/245.1 |
| 5,236,677 | A | | 8/1993 | Torres-Cardona et al. | |
| 5,599,713 | A | * | 2/1997 | Sato | ....................... 435/300.1 |
| 6,019,817 | A | | 2/2000 | Seagle | |
| 6,087,159 | A | * | 7/2000 | Finn | ....................... 435/299.1 |
| 6,106,592 | A | * | 8/2000 | Paranjpe et al. | ............... 95/65 |
| 2004/0043475 | A1 | * | 3/2004 | Proll et al. | .................. 435/266 |
| 2004/0137610 | A1 | * | 7/2004 | Park et al. | ................. 435/299.1 |

FOREIGN PATENT DOCUMENTS

| DE | 36 35 934 A1 | 4/1987 |
| DE | 41 41 529 C2 | 6/1993 |
| WO | 02/28515 A1 | 4/2002 |

* cited by examiner

*Primary Examiner*—Walter D Griffin
*Assistant Examiner*—Lydia Edwards
(74) *Attorney, Agent, or Firm*—Laurence A. Greenberg; Werner H. Stemer; Ralph E. Locher

(57) ABSTRACT

A bioscrubber for purifying dirty gas has a circulated scrubbing liquid which contains water and microorganisms for degradation of the substances to be separated off from the dirty gas. The gas enters at an inlet, moves through a mass-transfer zone, where it undergoes a phase change from the gas phase to the liquid phase, and the clean gas exits through an outlet. The system has a device for irrigating the mass-transfer zone with the scrubbing liquid, and a tank for collecting the scrubbing liquid and for activating the microorganisms. The bioscrubber has particularly high separation rates and particularly low risk of blockage because, in at least one mass-transfer zone of the bioscrubber, there may be provided a package of adjacent vertical tubes and a cleaning device for cleaning the tubes. A mass-transfer zone can be formed by a spray tower.

21 Claims, 4 Drawing Sheets

BIOSCRUBBER

CROSS-REFERENCE TO RELATED APPLICATION

This application claims the priority, under 35 U.S.C. §119, of Austrian application A 1931/2005, filed Nov. 30, 2005; the prior application is herewith incorporated by reference in its entirety.

BACKGROUND OF THE INVENTION

Field of the Invention

The invention relates to a bioscrubber for purifying waste gas having a circulated scrubbing liquid which contains water and microorganisms for degradation of the substances to be separated off from the waste gas. The assembly has an inlet for the dirty waste gas, an outlet for clean gas, and at least one mass-transfer zone wherein the dirty gas is transferred from the gas phase to the liquid phase. The assembly further has a device for irrigating the mass-transfer zone with the scrubbing liquid, and a tank for collecting the scrubbing liquid and for activating the microorganisms present therein.

Using bioscrubbers, waste gases, herein also referred to as dirty gases, which contain organic substances can be biologically cleaned. Microorganisms serve for degradation of the pollutants and substances, for which microorganisms this substance serves as nutrient. The microorganisms are customarily immobilized in so-called solids. By atomizing the scrubbing liquid over the packing, the dirty gases are transferred from the gas phase to the liquid phase. In this mass-transfer zone, the pollutants of the dirty gas are degraded by the microorganisms. The microorganisms are suspended in the scrubbing water and as a result arrive in the collecting tank of the scrubbing liquid, where the microorganisms present can be activated by addition of oxygen, nutrients and the like. From the collecting tank, the scrubbing liquid is recirculated to the irrigation devices.

German patent DE 41 41 529 C2 describes a biological method for purifying exhaust air which contains slightly water-soluble or water-insoluble substances. In the method a scrubbing liquid is used which contains a high-boiling organic oil which has a low solubility in water, is resistant to oxidation and hydrolysis, and has a high absorption capacity for lipophilic constituents. The bioscrubber contains a packing layer, above which nozzles for atomizing the scrubbing liquid are arranged. In the packings the microorganisms settle and successively block the channels via which the scrubbing liquid is to flow. Since the scrubbing liquid always chooses the path of least resistance, the blocked channels are also not cleaned again by the scrubbing liquid. Consequently it is necessary to change the packing or clean it in a complex manner, for example using sodium hydroxide solution. During the cleaning or the change of the packings, the bioscrubber is not available for purifying the exhaust gases. The tendency to blockage is also the main reason that such bioscrubbers are not used very frequently.

By way of a further example, international PCT publication WO 02/28515 A1 describes a plant for purifying exhaust gases using certain microorganisms which have their growth maximum in the thermophilic temperature range from 45° C. to 75° C. For immobilization of the microorganisms, internals are provided in the mass-transfer zone, the nature of which is not described in any more detail.

Finally, German published patent application DE 36 35 934 A1 describes a method and a device for purifying dirty gas, the dirty gas being sprayed, in an internal-less spray tower, with scrubbing liquid which is enriched with microorganisms. To lower the emission values, the dirty gas sprayed with scrubbing liquid is passed through an electrical high voltage field.

For the purification of dirty gases containing slightly water-soluble or water-insoluble substances, customarily scrubbing liquids are used which contain oils or oil-like substances as solvents. Outlet of these oil-like substances from the bioscrubber must absolutely be prevented to avoid damaging the environment. Furthermore, such solvents, owing to the higher viscosity and stickiness of the oil-biomass sludge, intensify the problems of blockage of the packings.

Conventional bioscrubbers in addition have poor degrees of separation, in particular in the case of dirty gases having hydrophobic substances.

SUMMARY OF THE INVENTION

It is accordingly an object of the invention to provide a bioscrubber, which overcomes the disadvantages of the heretofore-known devices and methods of this general type and with which a degree of separation as high as possible can be achieved and as low an amount of solubilizers as possible are necessary. In addition, the bioscrubber is to have maintenance intervals as long as possible, and to be constructed as simply and inexpensively as possible. Disadvantages of conventional bioscrubbers are to be avoided or at least reduced.

With the foregoing and other objects in view there is provided, in accordance with the invention, a bioscrubber for purifying dirty gas, comprising:

an inlet for the dirty gas and an outlet for cleaned gas;

circulated scrubbing liquid containing water and microorganisms for degrading substances to be separated off from the dirty gas;

at least one mass-transfer zone wherein the dirty gas is subjected to a phase change from a gas phase to a liquid phase;

a device for irrigating said mass-transfer zone with said scrubbing liquid;

a collection tank for collecting said scrubbing liquid and for activating said microorganisms contained therein; and at least one package of a plurality of substantially vertical and mutually adjacent tubes disposed in at least one said mass-transfer zone; and a cleaning device for cleaning said tubes disposed over at least one said package.

In other words, the objects of the invention are achieved with a bioscrubber wherein there are arranged in at least one mass-transfer zone at least one package of a plurality of substantially vertically adjacently arranged tubes and over at least one package a cleaning device for cleaning the tubes. By the use of such tube packages, instead of conventional packings, together with the cleaning device, the problem of blockage can be effectively prevented. Furthermore, such tube packages are relatively inexpensive and simple to produce. Owing to the substantially vertical arrangement of the tubes, the scrubbing liquid cannot be distributed transversely, for which reason any blockages in the tubes can be readily eliminated by the scrubbing liquid. Owing to the reduced risk of blockage, additives or solvents such as, for example, oil-like substances, can also be added to the scrubbing liquid, as a result of which the separation rates can be increased, in particular for slightly water-soluble substances. Thus an efficient cleaning of dirty gases which contain slightly water-soluble or water-insoluble and water-soluble substances can be achieved.

The tubes can have a round, angular, in particular square, or hexagonal, or else triangular or other polygonal cross section. In the case of a hexagonal cross section, a honeycomb structure results having a particularly large surface area at which the dirty gas transfers from the gas phase to the liquid phase.

According to a further feature of the invention, the tubes have a substantially zig-zag-shaped course in a flow direction.

To increase the separation action further, preferably a plurality of packages are arranged one above the other.

Further improvement of the cleaning is achieved by the means that the cleaning device for cleaning the tubes is constructed with flushing densities greater than 100 $m^3/m^2h$.

Preferably, the cleaning device is formed by a so-called a rotary sprinkler, wherein a relatively narrow water jet is formed and this is slowly moved over all tubes of a package by rotation of an axle having at least one nozzle. The water jet is distributed onto only two to three tubes and is distributed over the entire package by rotating the nozzle. Such a cleaning device can achieve high flushing densities at relatively low water rates. Alternatively to a rotary sprinkler, the nozzle can also be moved over the tubes of a package by sliding.

To achieve the slow rotation of a rotary sprinkler, this is preferably connected to a drive, since only in the case of externally-driven rotary sprinklers are the low rotary velocities achievable.

Advantageously, in the case of the above-described construction of the bioscrubber, the dirty gas inlet is arranged beneath, and the clean gas outlet above, the at least one mass-transfer zone having the at least one package of tubes and the dirty gas flows through the tubes in the countercurrent flow principle. In this through-flow, the cleaning action is best.

Alternatively thereto, the dirty gas inlet can also be arranged above, and the clean gas outlet below, the at least one mass-transfer zone having the at least one package of tubes and the dirty gas flows through the tubes in the co-current flow principle.

In addition, a mass-transfer zone can be formed by a spray tower. In this spray tower which is free from internals and packings, the dirty gases are transferred from the gas phase to the liquid phase without the risk of blockage of packings. Precisely in the case of purifying dirty gases containing slightly water-soluble or water-insoluble substances by scrubbing liquids which contain oil or oil-like substances, safe operation and a high degree of separation can thereby be achieved. Such bioscrubbers are suitable, for example, for cleaning dirty gases as arise in the timber product industry. Depending on type of wood and production process, the dirty gases contain a relatively large fraction of resins, terpenes, waxes or oils. These hydrocarbon compounds can be removed with difficulty using conventional bioscrubbers, since they are virtually water-insoluble. Such a stage of a bioscrubber is used best in practice when only small degrees of separation of approximately 50 to 80% are required. For a compact structure, such bioscrubbers are used with low residence times of 1 to 5 seconds. For an efficient mass transfer, only a fine atomization of the scrubbing liquid in the spray tower is required. Fine droplets are preferably produced by nozzles which are constructed in such a manner that they do not plug rapidly with scrubbing liquids having high solids contents.

Advantageously, a plurality of irrigation devices having nozzles for atomizing the scrubbing liquid are arranged in the spray tower. The irrigation devices can be arranged in the spray tower distributed both in horizontal and also vertical direction. By arranging the nozzles in a plurality of planes, fine droplets can be formed over the entire height of the bioscrubber. This is necessary because the fine droplets agglomerate and would thus shift the droplet spectrum toward larger diameters. As nozzles, use can be made of, in particular, tangential hollow-cone nozzles which produce particularly fine droplets and thus achieve efficient transfer of the dirty gases from the gas phase to the liquid phase. Such hollow-cone nozzles can have a minimum cross section of approximately 5 to 15 mm, in particular 10 mm. As a result, a fine atomization is achieved with simultaneously low susceptibility to blockage.

When use is made of such a stage of a bioscrubber having at least one mass-transfer zone constructed as a spray tower, the dirty gas inlet is advantageously arranged above, and the clean gas outlet below, the mass-transfer zone and the dirty gas flows through the mass-transfer zone in the co-current flow principle.

For dehumidifying the clean gases before their outlet into the atmosphere, a mist separator can be arranged upstream of the clean gas outlet.

To achieve activation of the microorganisms present in the collection tank, advantageously, an aeration device is arranged, via which air or oxygen is blown into the collection tank.

According to a further feature of the invention, lines are provided for feeding nutrients. In particular, nitrogen and phosphorus can be added to the microorganisms as nutrients, and as a result the growth is improved.

According to a further feature of the invention, the scrubbing liquid contains solvents for dissolving apolar and organic substances. In principle, all apolar solvents are suitable which are not biodegraded or are degraded slowly and are nontoxic to the microorganisms used. Usually, the scrubbing liquid consists of 70 to 100% water and 0 to 30% of such solvents. The fraction of solvent depends on the desired degree of separation for the apolar substances. In order to keep the evaporation losses low, the solvent preferably has low vapor pressure.

Silicone oil as solvent is particularly suitable for purifying dirty gases containing water-insoluble or slightly water-soluble substances.

According to a further feature of the invention, the scrubbing liquid contains thermophilic microorganisms which have their growth maximum in the thermophilic temperature range from 45° C. to 75° C.

The use of mesophilic microorganisms which have their growth maximum in the mesophilic temperature range from about 25 to 45° C. is also possible.

Other features which are considered as characteristic for the invention are set forth in the appended claims.

Although the invention is illustrated and described herein as embodied in bioscrubber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
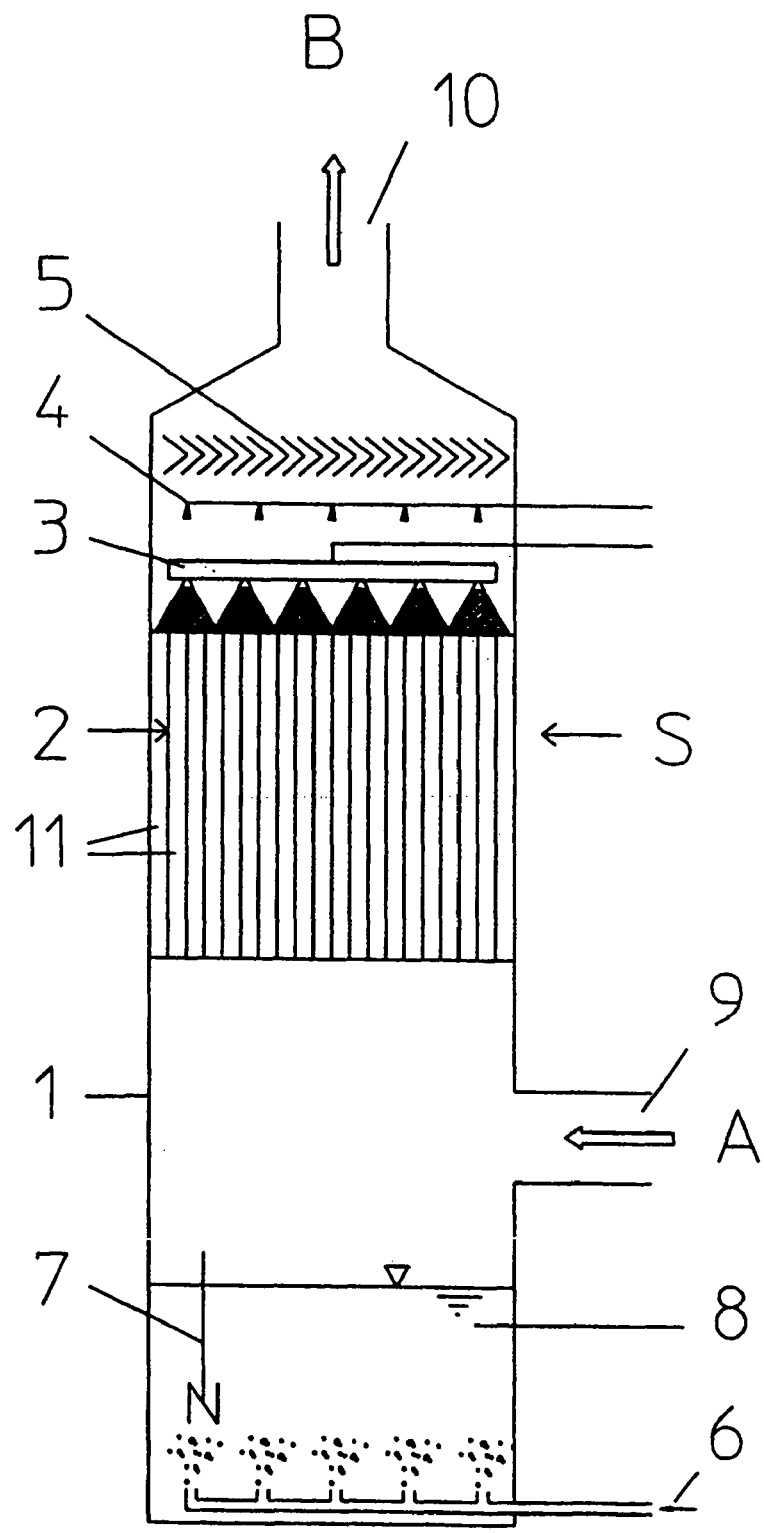
FIG. 1 is a diagrammatic sectional view of a bioscrubber having internals.

Referring now to the figures of the drawing in detail and first, particularly, to FIG. 1 thereof, there is shown an embodiment of a bioscrubber 1 according to the invention in a diagrammatic sectional view. The bioscrubber 1 has a substantially tower-shaped structure with an inlet 9 for waste gas, i.e., dirty gas A, wherein the substances to be purified are present. Via a clean gas outlet 10, the clean gas B purified from the substances is passed into the atmosphere or to further filter stages. The dirty gas A flows through at least one mass-transfer zone S wherein the dirty gas A is transferred from the gas phase to the liquid phase. A device 4 irrigates the mass-transfer zone S with scrubbing liquid which contains water and microorganisms for degradation of the substances. The scrubbing liquid is collected in a tank 8 and thereafter recirculated to the irrigation device 4 by corresponding pumps (which are not shown). In the collection tank 8 the microorganisms present in the scrubbing liquid are activated by aeration devices 6 and possible stirring devices 7. The aeration device 6 and the stirring devices 7 also serve for dispersing possible substances in the scrubbing liquid. In addition, the activated sludge in the collection tank 8 can be kept at an appropriate temperature at which the microorganisms used have their growth maximum. Finally, further nutrients, such as, for example nitrogen and phosphorus, can be fed to the activated sludge in the collection tank 8. This can proceed via corresponding lines. In at least one mass-transfer zone S at least one package 2 of a plurality of substantially vertical, adjacently arranged tubes 11 is disposed. By means of the tubes 11 of the package 2, the surface area in the mass-transfer zone S, wherein the dirty gas A is transferred from the gas phase to the liquid phase, is increased. Via the substantially vertical arrangement of the tubes 11, blockage of the package 2 is prevented or made difficult. Before the clean gas B passes via the clean gas outlet 10 into the atmosphere or to further filter stages, a mist separator 5 can be arranged for separating off fine droplets in the clean gas B.

Figures 2A, 2B, 2C:
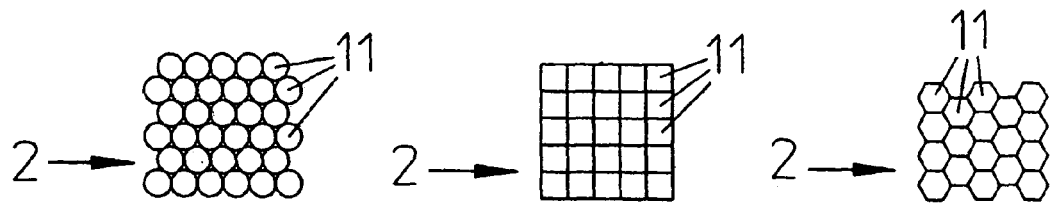
FIGS. 2A to 2C are three plan views from above, showing various embodiments of packages of tubes.
Figures 2D, 2E:
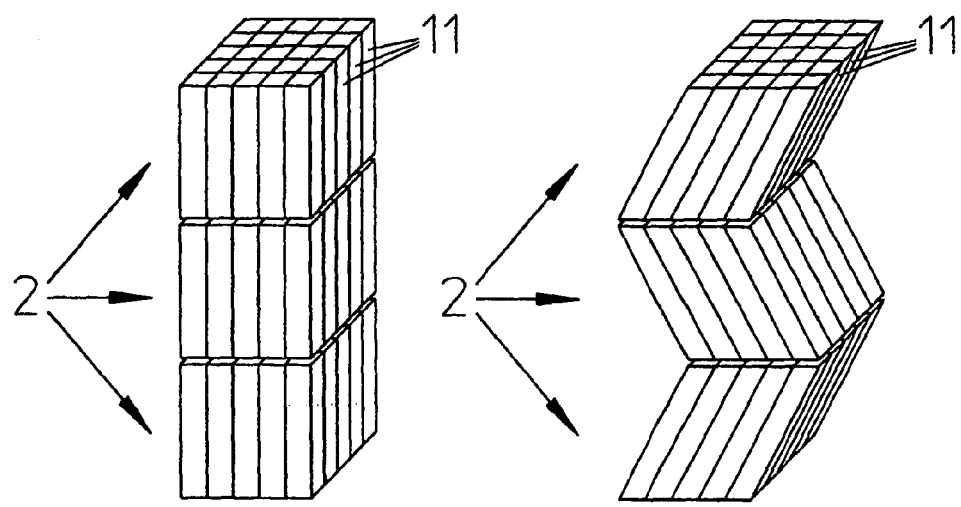
FIGS. 2D to 2G are perspective views of various arrangements of tube packages.
Figures 2F, 2G:
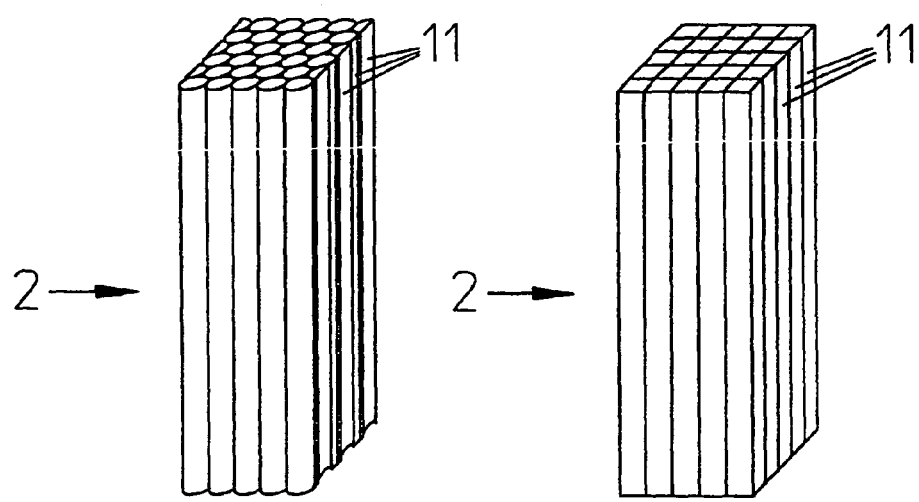

FIGS. 2A to 2C show three different variants of inventive packages 2 consisting of a plurality of substantially vertically arranged tubes 11 having round (FIG. 2A), boxed, in particular square (FIG. 2B), or hexagonal (FIG. 2C) cross section. Owing to the substantially vertical arrangement of the tubes 11, any blockages are eliminated by the scrubbing liquid. As a result of the vertical arrangement of the tubes 11, no transverse distribution of the scrubbing liquid takes place and maximum flushing action is achieved. The tubes 11 are arranged in packages 2 of which a plurality can be stacked one above the other.

FIGS. 2D to 2G show different assemblies of packages 2 of a plurality of substantially vertically adjacently arranged tubes 11. In the case of the variant according to FIG. 2E, the tubes 11 of the packages 2 arranged one above the other are arranged to run in a zig-zag shape, or slightly meandering course.

Figure 3A:
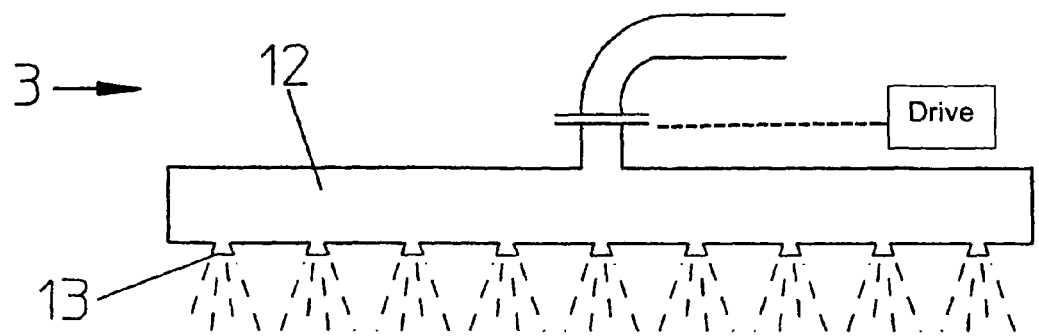
FIG. 3A id a detailed view of an embodiment of a cleaning device of the bioscrubber.
Figure 3B:
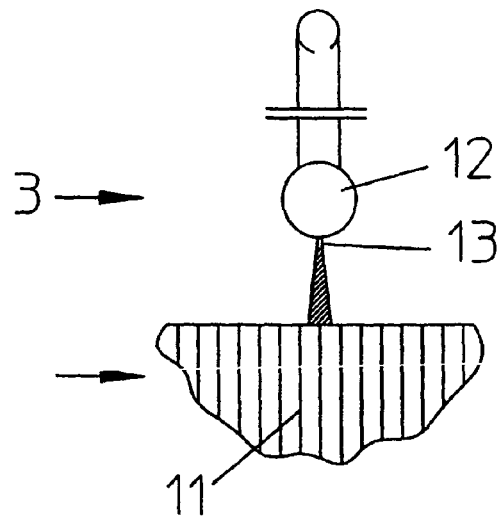
FIG. 3B is a rotated view of the cleaning device.

For cleaning, over at least one package 2, a cleaning device 3 is arranged for irrigating the tubes 11 of the package 2 with scrubbing liquid, preferably with particularly high flushing densities. The high flush densities with simultaneously low scrubbing liquid consumption are achieved, in particular, by what is termed a rotary sprinkler 12 which is shown in the detail views according to FIGS. 3A and 3B. This rotary sprinkler 12 equipped with nozzles 13 achieves a very narrow jet of scrubbing liquid which reaches, for example, over some few tubes 11 of the package 2. As a result, for example flush densities of greater than 100 $m^3/m^2h$ can be achieved. The rotary sprinklers 12 rotate particularly slowly, for example at 0.5 rph. For this purpose the axles of the rotary sprinkler 12 on which the nozzles 13 are arranged are preferably connected to a separate drive, as diagrammatically indicated in FIG. 3A. The abovementioned irrigation device 4 arranged above the cleaning device 3 serves for uniform distribution of the scrubbing liquid onto the surface of the packages 2. The irrigation densities are in ranges from, for example, 5 to 50 $m^3/m^2h$, in particular 10 to 20 $m^3/m^2h$.

Figure 4:
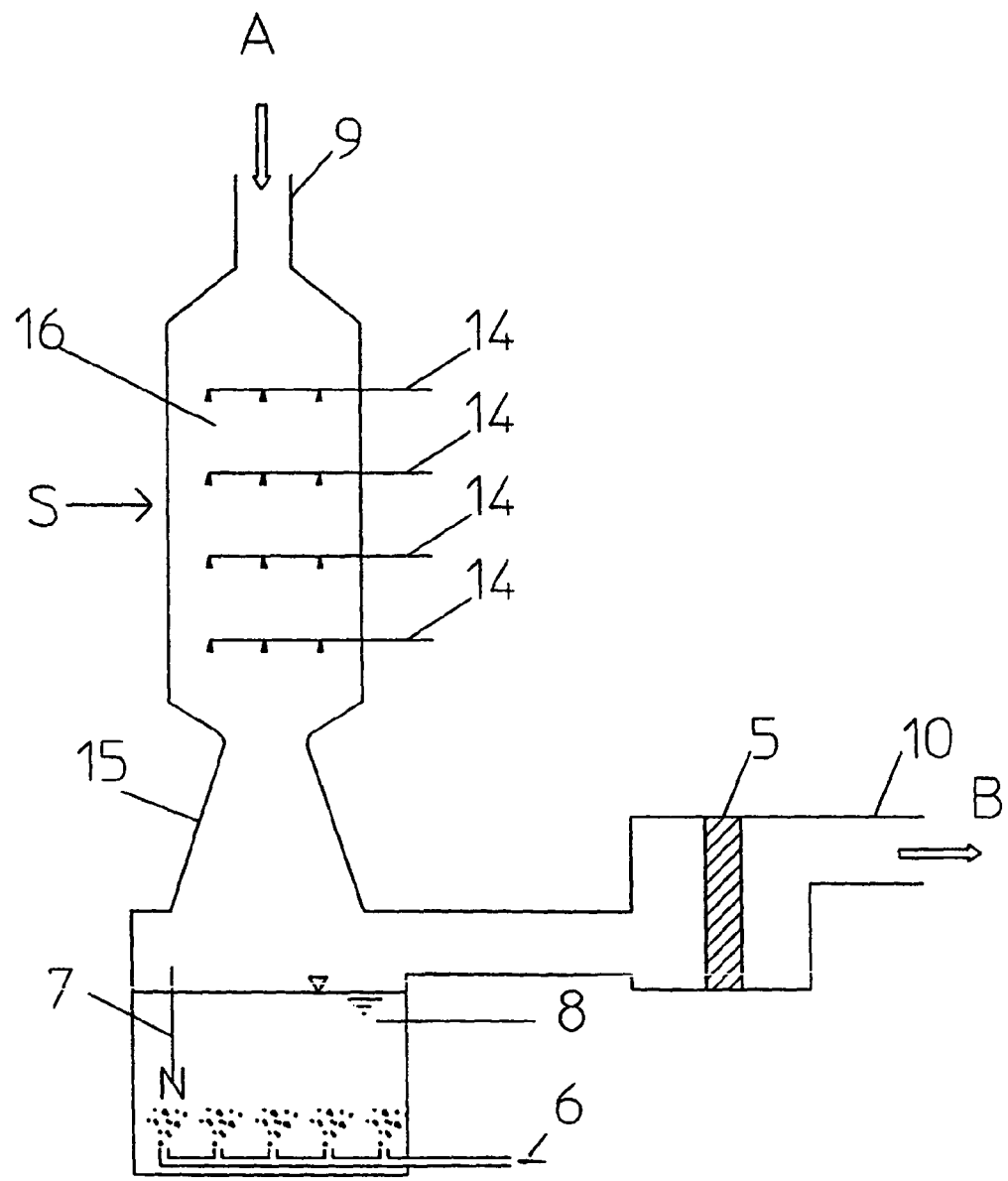
FIG. 4 is a diagrammatic sectional view of a stage of a bioscrubber having a mass-transfer zone constructed as a spray tower.

FIG. 4 shows a schematic block diagram of one stage of a bioscrubber 1 wherein the mass-transfer zone S is formed by a spray tower 16. In the mass-transfer zone S formed as spray tower 16, the dirty gas A is transferred from the gas phase to the liquid phase by fine atomization of the scrubbing liquid. This fine atomization proceeds in a plurality of devices 14 arranged in the spray tower 16 for irrigating the mass-transfer zone S with the scrubbing liquid. The spray tower 16 is completely free from internals, as a result of which the risk of blockage can be excluded. In order to achieve the required volume for an efficient mass transfer, the spray tower 16 is usually constructed with an enlarged cross section. At the spray tower 16 a constriction in the form of a Venturi 15 can be arranged. In the example shown the inlet 9 for the dirty gas A is situated above the mass-transfer zone S and the outlet 10 for the clean gas B below the mass-transfer zone S, as a result of which the dirty gas A flows through the mass-transfer zone S in the co-current flow principle. Customarily, the embodiments of the bioscrubber according to FIGS. 1 and 4 are combined and a plurality of stages with or without packages 2 having a plurality of tubes 11 are used for cleaning the dirty gases A. Bioscrubbers according to FIG. 4 are used, in particular, when relatively low degrees of separation are required. For higher degrees of separation, bioscrubbers according to FIG. 1 are used. It is thereby possible to subject the waste gas to precleaning using a bioscrubber according to FIG. 4.

The bioscrubber 1 described provides efficient cleaning of dirty gases which contain water-insoluble or slightly water-soluble substances, without the risk of a blockage of packings. As a result, particularly efficient cleaning of dirty gases is possible.

I claim:

1. A bioscrubber for purifying dirty gas, comprising:
   an inlet for the dirty gas and an outlet for cleaned gas;
   circulated scrubbing liquid containing water and microorganisms for degrading substances to be separated off from the dirty gas;

at least one mass-transfer zone wherein a phase change of the dirty gas (A) is effected from a gas phase to a liquid phase;

a device for irrigating said mass-transfer zone with said scrubbing liquid;

a collection tank for collecting said scrubbing liquid and for activating said microorganisms contained therein; and at least one package of a plurality of substantially vertical and mutually adjacent tubes disposed in at least one said mass-transfer zone; and a cleaning device for cleaning said tubes disposed over at least one said package, said cleaning device being a rotary sprinkler, and said cleaning device for cleaning said tubes being configured with flushing densities greater than 100 $m^3/m^2h$.

2. The bioscrubber according to claim 1, wherein said tubes have a round cross section.

3. The bioscrubber according to claim 1, wherein said tubes have a polygonal cross section.

4. The bioscrubber according to claim 3, wherein said tubes have a square cross section.

5. The bioscrubber according to claim 1, wherein said tubes have a hexagonal cross section.

6. The bioscrubber according to claim 1, wherein said tubes extend along a substantially zig-zag-shaped course.

7. The bioscrubber according to claim 1, wherein said at least one package is one of a plurality of packages arranged one above the other.

8. The bioscrubber according to claim 1, which comprises a drive connected to drive said rotary sprinkler.

9. The bioscrubber according to claim 1, wherein said inlet is disposed below said at least one mass-transfer zone, said outlet is disposed above said at least one mass-transfer zone, and wherein the dirty gas is caused to flow through said tubes in a countercurrent flow.

10. The bioscrubber according to claim 1, wherein said inlet is disposed above said at least one mass-transfer zone, said outlet is disposed below said at least one mass-transfer zone, and wherein the dirty gas is caused to flow through said tubes in a co-current flow.

11. The bioscrubber according to claim 1, which comprises a spray tower forming said mass-transfer zone.

12. The bioscrubber according to claim 11, which comprises a plurality of irrigation devices with nozzles for atomizing the scrubbing liquid disposed in said spray tower.

13. The bioscrubber according to claim 11, wherein said inlet is disposed above said spray tower, and said outlet is disposed below said spray tower, and the dirty gas is caused to flow through said spray tower forming said at least one mass-transfer zone in a co-current flow.

14. The bioscrubber according to claim 1, which comprises a mist separator disposed upstream of said outlet.

15. The bioscrubber according to claim 1, which comprises an aeration device disposed in said collection tank.

16. The bioscrubber according to claim 1, which comprises lines connected for feeding nutrients.

17. The bioscrubber according to claim 1, wherein said scrubbing liquid contains solvents for dissolving polar and organic substances.

18. The bioscrubber according to claim 17, wherein one of said solvents has low vapor pressure.

19. The bioscrubber according to claim 17, wherein one of said solvents is silicone oil.

20. The bioscrubber according to claim 1, wherein said scrubbing liquid contains thermophilic microorganisms.

21. The bioscrubber according to claim 1, wherein said scrubbing liquid contains mesophilic microorganisms.

* * * * *